(12) United States Patent
Wei et al.

(10) Patent No.: US 10,582,128 B2
(45) Date of Patent: *Mar. 3, 2020

(54) OPTICAL IMAGE STABILIZATION SYSTEM, IMAGING DEVICE, AND ELECTRONIC DEVICE

(71) Applicant: GUANGDONG OPPO MOBILE TELECOMMUNICATIONS CORP., LTD., Dongguan, Guangdong (CN)

(72) Inventors: Yi Wei, Guangdong (CN); Qiqun Zhou, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/436,175

(22) Filed: Jun. 10, 2019

(65) Prior Publication Data

US 2019/0297261 A1    Sep. 26, 2019

Related U.S. Application Data

(63) Continuation of application No. 16/196,704, filed on Nov. 20, 2018, which is a continuation of application No. PCT/CN2017/084217, filed on May 12, 2017.

(30) Foreign Application Priority Data

Jul. 29, 2016   (CN) .......................... 2016 1 0616350

(51) Int. Cl.
*H04N 5/232* (2006.01)
*H04N 5/225* (2006.01)
(Continued)

(52) U.S. Cl.
CPC .......... *H04N 5/23248* (2013.01); *G02B 7/02* (2013.01); *G06F 1/1686* (2013.01); *H04N 5/2253* (2013.01); *H04N 5/2257* (2013.01)

(58) Field of Classification Search
None
See application file for complete search history.

(56) References Cited

U.S. PATENT DOCUMENTS

| 7,214,919 B2 * | 5/2007 | Boemler ........... H01L 27/14618 250/208.1 |
| 9,794,460 B1 * | 10/2017 | Kim ..................... H04N 5/2252 |

(Continued)

FOREIGN PATENT DOCUMENTS

| CN | 1667449 | 9/2005 |
| CN | 101420526 | 4/2009 |

(Continued)

OTHER PUBLICATIONS

WIPO, ISR for CN Application No. PCT/CN2017/084217, Jul. 28, 2017.

(Continued)

*Primary Examiner* — Cynthia Segura
(74) *Attorney, Agent, or Firm* — Hodgson Russ LLP

(57) ABSTRACT

An optical image stabilization system, an imaging device, and an electronic device are provided. The optical image stabilization system includes a micro electro-mechanical system (MEMS), and an image sensor. The MEMS includes a fixed electrode, a movable electrode, and a deformable connection member. The movable electrode cooperates with the fixed electrode. The deformable connection member is configured to fixedly connect the fixed electrode with the movable electrode. The image sensor is fixedly connected to the movable electrode. The fixed electrode and the movable electrode are configured to generate an electrostatic force under a driving voltage. The deformable connection member (Continued)

is configured to deform under the electrostatic force in a direction where the movable electrode moves, to make the movable electrode move, so as to drive the image sensor to move.

19 Claims, 4 Drawing Sheets

(51) Int. Cl.
*G02B 7/02* (2006.01)
*G06F 1/16* (2006.01)

(56) References Cited

U.S. PATENT DOCUMENTS

| | | | | |
|---|---|---|---|---|
| 10,389,943 | B2* | 8/2019 | Gutierrez | G03B 3/10 |
| 2006/0092514 | A1* | 5/2006 | Koo | G02B 13/001 |
| | | | | 359/557 |
| 2006/0175532 | A1 | 8/2006 | Boemler | |
| 2007/0257989 | A1* | 11/2007 | Shirono | H04N 5/2253 |
| | | | | 348/208.99 |
| 2008/0054758 | A1* | 3/2008 | Tsuboi | H02N 1/008 |
| | | | | 310/309 |
| 2012/0139064 | A1* | 6/2012 | Nakatani | B81C 1/00182 |
| | | | | 257/415 |
| 2012/0291548 | A1* | 11/2012 | Kanemoto | G01C 19/5733 |
| | | | | 73/504.12 |
| 2013/0098152 | A1* | 4/2013 | Jeong | G01C 19/574 |
| | | | | 73/504.12 |
| 2013/0256814 | A1* | 10/2013 | Tanaka | B81B 3/0021 |
| | | | | 257/415 |
| 2015/0098001 | A1 | 4/2015 | Takayama | |
| 2015/0108591 | A1* | 4/2015 | Takizawa | B81B 7/0041 |
| | | | | 257/415 |
| 2015/0268046 | A1* | 9/2015 | Takizawa | G01C 19/5747 |
| | | | | 73/504.12 |
| 2015/0268266 | A1* | 9/2015 | Furuhata | G01P 15/08 |
| | | | | 73/504.03 |
| 2015/0276853 | A1* | 10/2015 | Murashima | G01R 31/28 |
| | | | | 324/537 |
| 2015/0321900 | A1 | 11/2015 | Liu et al. | |
| 2015/0350500 | A1 | 12/2015 | Gutierrez et al. | |
| 2016/0052776 | A1 | 2/2016 | Kolb et al. | |
| 2016/0123736 | A1* | 5/2016 | Nakagawa | G01C 19/5607 |
| | | | | 73/504.12 |
| 2016/0241785 | A1* | 8/2016 | Chiouchang | H04N 5/23287 |
| 2017/0121171 | A1* | 5/2017 | Takizawa | B81B 7/007 |
| 2018/0279990 | A1* | 10/2018 | Hasegawa | G01S 7/5202 |
| 2019/0089902 | A1* | 3/2019 | Wei | G02B 7/02 |
| 2019/0222739 | A1 | 7/2019 | Yang | |
| 2019/0297247 | A1 | 9/2019 | Yang | |
| 2019/0297261 | A1 | 9/2019 | Wei et al. | |

FOREIGN PATENT DOCUMENTS

| | | |
|---|---|---|
| CN | 101668382 | 3/2010 |
| CN | 102624397 | 8/2012 |
| CN | 103168000 | 6/2013 |
| CN | 103297665 | 9/2013 |
| CN | 103364586 | 10/2013 |
| CN | 103762187 | 4/2014 |
| CN | 105025657 | 11/2015 |
| CN | 105428375 | 3/2016 |
| CN | 105789233 | 7/2016 |
| CN | 106254773 | 12/2016 |
| WO | 2015153017 | 10/2015 |

OTHER PUBLICATIONS

SIPO, First Office Action for CN Application No. 201610616350, dated Jun. 5, 2017.
SIPO, Second Office Action for CN Application No. 201610616350, dated Aug. 14, 2017.
SIPO, Third Office Action for CN Application No. 201610616350, dated Oct. 23, 2017.
EPO, Office Action for EP Application No. 17833303, dated Mar. 21, 2019.
SIPO, Notification to Grant Patent Right for Invention for CN Application No. 201610616350, dated Dec. 5, 2017.
SIPO, First Office Action for CN Application No. 201711476798.7, dated May 28, 2019.
USPTO, Office Action for U.S. Appl. No. 16/196,704, dated Dec. 11, 2019.

* cited by examiner

OPTICAL IMAGE STABILIZATION SYSTEM, IMAGING DEVICE, AND ELECTRONIC DEVICE

CROSS-REFERENCE TO RELATED APPLICATIONS

This application is a continuation of U.S. application Ser. No. 16/196,704, filed Nov. 20, 2018, which is a continuation of International Application No. PCT/CN2017/084217, filed May 12, 2017, which claims priority to and benefits of Chinese Patent Application Serial No. 201610616350.X, filed Jul. 29, 2016. The entire contents of the aforementioned applications are incorporated herein by reference.

FIELD

The present disclosure relates to the field of an optical image stabilization technology, and more particularly to an optical image stabilization system, an imaging device and an electronic device.

BACKGROUND

In the existing optical image stabilization system, a voice coil motor is used as an actuator and usually has a large size, which is disadvantageous for miniaturization of an imaging device and an electronic device using the existing optical image stabilization system.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
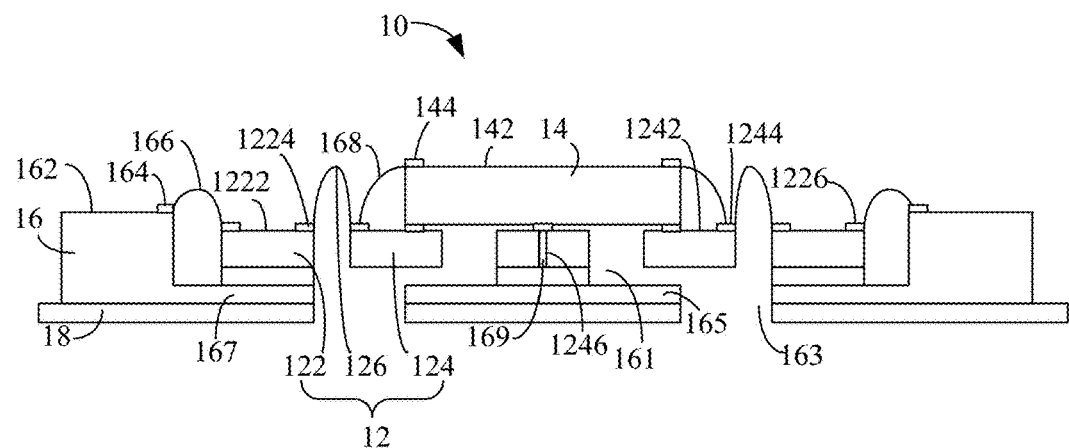
FIG. 1 is a schematic view of an optical image stabilization system according to an embodiment of the present disclosure.

REFERENCE NUMERALS optical image stabilization system 10, inner frame 11, inner frame pad 112, MEMS 12, fixed electrode 122, upper surface 1222, first pad 1224, fourth pad 1226, movable electrode 124, upper surface 1242, second pad 1244, via hole 1246, connection member 126, deformable wire 1262, connection tab 1264, first pair X1, second pair Y1, third pair X2, fourth pair Y2, outer frame 13, outer frame pad 132, image sensor 14, upper surface 142, fifth pad 144, circuit board 16, groove 161, upper surface 162, annular through recess 163, third pad 164, movable part 165, first wire 166, fixed part 167, second wire 168, conductive paste 169, reinforcing plate 18, imaging device 20, electronic device 30, lens assembly 40, display 50, housing 60.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise", should be construed to refer to the orientation as then described or as shown in the drawings under discussion. These relative terms are for convenience of description and do not require that the present invention be constructed or operated in a particular orientation, and thus shall not be construed to limit the present disclosure. In addition, it should be understood that terms such as "first" and "second" are used herein for purposes of description and are not intended to indicate or imply relative importance or significance or to imply the number of indicated technical features. Therefore, the feature defined with "first" and "second" may include one or more of this feature. In the description of the present disclosure, unless specified otherwise, "a plurality of" means two or more than two, such as two or three.

In the present disclosure, unless specified or limited otherwise, the terms "mounted", "connected" and "coupled" and the like are used broadly, and may be, for example, fixed connections, detachable connections, or integral connections; may also be mechanical or electrical connections; may also be direct connections or indirect connections via intervening structures; may also be inner communications or inner interactions of two elements. Specific meanings of the above terms in the present disclosure can be understood by those skilled in the art according to specific conditions.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As shown in FIG. 1, an optical image stabilization system 10 according to an embodiment of the present disclosure includes a micro electro-mechanical system (MEMS) 12 and an image sensor 14. The MEMS 12 includes a fixed electrode 122, a movable electrode 124, and a deformable connection member 126. The movable electrode 124 cooperates with the fixed electrode 122. The deformable connection member 126 is configured to fixedly connect the fixed electrode 122 with the movable electrode 124. The fixed electrode 122 and the movable electrode 124 are configured to generate an electrostatic force under a driving voltage. The deformable connection member 126 is configured to deform under the electrostatic force in a direction where the movable electrode 124 moves, to make the movable electrode 124 move, so as to drive the image sensor 14 to move to compensate for a jitter.

The jitter refers to a jitter that occurs during an exposure process in using the electronic device 30 to take pictures, which causes blurring of an image output by the imaging device 20. The imaging quality of the imaging device 20 may be improved by using the optical image stabilization system 10.

The MEMS is a high-tech electromechanical device developed from the microelectronics technology (the semiconductor manufacturing technology) combining photoetching, corroding, thin film forming, LIGA (LIGA is an abbreviation for German words of lithographie, galvanoformung and abformung indicating lithography, electroforming and impressing, respectively), silicon micromachining, non-silicon micromachining, and precision machining technologies, and has a smaller size when compared with the existing voice coil motor, which is advantageous for the miniaturization of the optical image stabilization system 10.

For example, in some embodiments of the present disclosure, the MEMS 12 has a size of 8.5 mm*8.5 mm or less in a lateral dimension. Moreover, with the development of the semiconductor manufacturing technology, the size of the MEMS 12 may be smaller.

Therefore, compared with the existing voice coil motor, the MEMS 12 has a size in a millimeter level or lower, and thus has a significant advantage in size.

Figure 2:
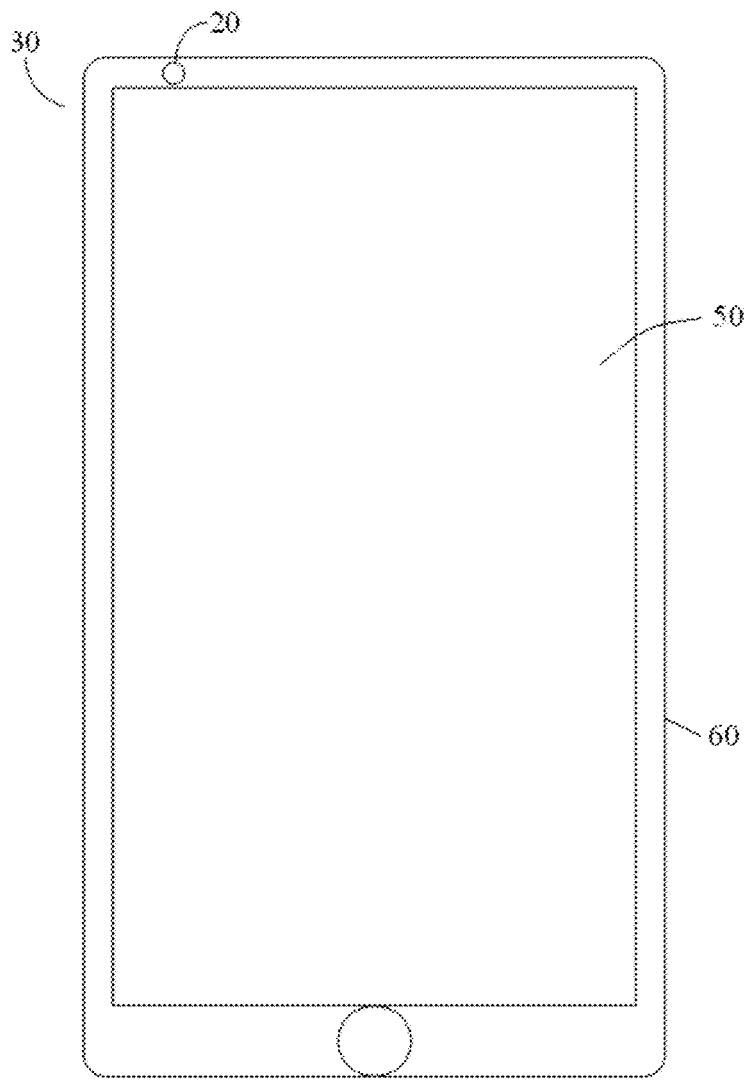
FIG. 2 is a schematic view of an electronic device according to an embodiment of the present disclosure.

With reference to FIG. 2, the optical image stabilization system 10 according to the embodiments of the present disclosure may be applied to the imaging device 20 according to the embodiments of the present disclosure, and the imaging device 20 according to the embodiments of the present disclosure may be applied to an electronic device 30 according to the embodiments of the present disclosure. In some embodiments of the present disclosure, the imaging device 20 includes the optical image stabilization system 10 described above and a lens assembly 40 coupled to the optical image stabilization system 10. In some embodiments of the present disclosure, the electronic device 30 includes a housing 60, a display 50 connected with the housing and the imaging device 20 disposed in the housing 60. For example, the electronic device 30 according to the embodiments of the present disclosure may be a mobile phone or a tablet computer, and the imaging device 20 according to the embodiments of the present disclosure may be a front camera or a rear camera of a mobile phone or a tablet computer.

Moreover, by using the optical image stabilization system 10 according to the embodiments of the present disclosure, the imaging device 20 and the electronic device 30 according to the embodiments of the present disclosure may be advantageously miniaturized.

In addition, due to an electrostatic force actuation (i.e., an actuation based on an attraction among electrostatic charges), on one hand, the MEMS 12 has a less power consumption when compared with the existing voice coil motor, for example, in some embodiments of the present disclosure, the power consumption of the MEMS 12 is less than 10 mW, on the other hand, the MEMS 12 has a low heat generation and thus having no problem of heat dissipation.

In some embodiments of the present disclosure, by performing thin film forming, photoetching, corroding, laser cutting, silicon micromachining, non-silicon micromachining and precision machining technologies on a silicon substrate (not shown), the fixed electrode 122 and the movable electrode 124 may be formed, and the movable electrode 124 is floating and is connected with the fixed electrode 122 by the connection member 126.

In some embodiments of the present disclosure, the MEMS 12 includes a plurality of pairs of the fixed electrodes 122 and the movable electrodes 124, and each pair of the fixed electrode 122 and the movable electrode 124 is configured to drive the image sensor 14 to move in a predetermined direction in a same plane.

In this way, the plurality of pairs of the fixed electrodes 122 and the movable electrodes 124 may compensate for jitters in different directions. Moreover, a plurality of pairs of the fixed electrodes 122 and the movable electrodes 124 may cooperate with each other in the same plane, that is, a plurality of pairs of the fixed electrodes 122 and the movable electrodes 124 may be in the same plane. Therefore, the MEMS 12 may have a single-layer electrode structure, which can simplify the structure of the MEMS 12, thus making the MEMS 12 simple in structure and easy to manufacture.

In some embodiments of the present disclosure, the connection member 126 may also be formed by performing thin film forming, photoetching, corroding, laser cutting, silicon micromachining, non-silicon micromachining and precision machining technologies on a silicon substrate (not shown).

Figure 3:
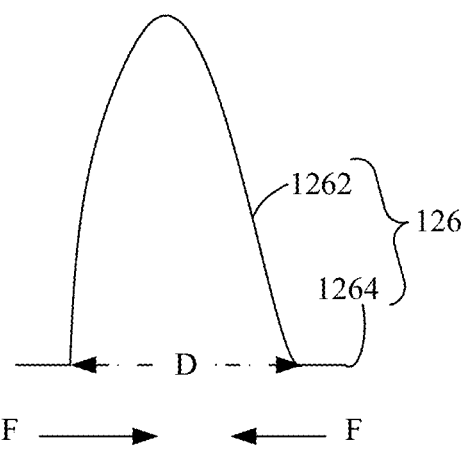
FIG. 3 is a schematic view of a connection member according to an embodiment of the present disclosure.

With reference to FIG. 3, in some embodiments of the present disclosure, the connection member 126 includes a deformable wire 1262 and a pair of connection tabs 1264 connected to both ends of the deformable wire 1262 respectively.

In this way, good mechanical connection and deformation characteristics may be provided by the deformable wire 1262, and the connection tab 1264 may be used to increase the connection area with the fixed electrode 122 or the movable electrode 124, thus improving the connection strength.

In some embodiments of the present disclosure, the deformable wire 1262 may be a silicon wire.

In this way, the deformable wire 1262 may be manufactured by the semiconductor manufacturing technology.

In some embodiments of the present disclosure, the shape and the size of the deformable wire 1262 may be determined according to material properties, such that the movable electrode 124 may be suspended by the deformable wire 1262 to the fixed electrode 122 and the deformable wire 1262 may deform in the moving direction of the movable electrode 124.

For example, in some embodiments of the present disclosure, the deformable wire 1262 is the silicon wire and has a rectangular cross-section, a width of 10 to 30 µm, a thickness of 1 to 3 µm, and a length of 500 to 800 µm. A width direction of the deformable wire 1262 is perpendicular to the moving direction of the movable electrode 124 when the deformable wire 1262 is configured to connect the fixed electrode 122 with the movable electrode 124.

As an example, the deformable wire 1262 has a width of 25 µm, a thickness of 1.5 µm, and a length of 600 µm.

Figure 4:
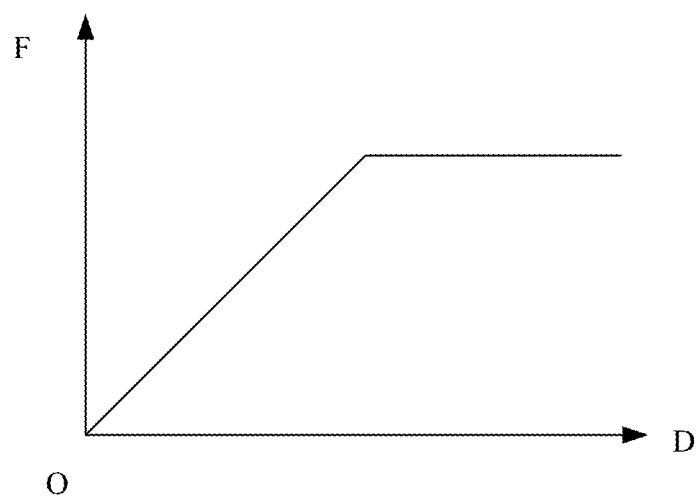
FIG. 4 is a graph showing a force-deformation characteristic curve of a connection member according to an embodiment of the present disclosure.

With reference to FIG. 4, in settings of the shape and the size, the deformable wire 1262 may be deformed only in the moving direction of the movable electrode 124 under an external force, and the deformation of the deformable wire 1262 is proportional to the external force within a certain external force range (i.e., the external force is smaller than a predetermined threshold). The deformable wire 1262 remains rigid and is not easy to deform in other directions. On this basis, when the electrostatic force F is smaller than the predetermined threshold, the deformation D (horizontal axis) of the deformable wire 1262 in the moving direction of the movable electrode 124 under the electrostatic force F is proportional to the electrostatic force F (vertical axis).

In this way, by precisely controlling the driving voltage, the MEMS 12 has a very high moving accuracy when compared with the existing voice coil motor, and the accuracy may be in a pixel level (i.e., a distance accuracy of movement of the image sensor 14 driven by the MEMS 12 for each time may be equivalent to a pixel of the image sensor 14).

In some embodiments of the present disclosure, when the electrostatic force F is smaller than a predetermined threshold, an adjustment value between two adjacent electrostatic forces may result in a deformation D (i.e., a change in amplitude) smaller than or equal to 150 µm.

In other words, the MEMS 12 may drive the image sensor 14 to move 150 that is, a compensation capability/range of the optical image stabilization system 10 may be 150 µm (in compensation accuracy), and the MEMS 12 has a strong compensation ability when compared with the existing voice coil motor.

In addition, the MEMS 12 may have a higher mechanical frequency due to applications of the materials, shapes and sizes of the above embodiments. For example, in some embodiments of the present disclosure, the mechanical frequency of the MEMS 12 is typically between 80 to 120 Hz, such as 100 Hz. Therefore, due to the high mechanical frequency, the MEMS 12 may be less sensitive to sound or vibration when compared with the mechanical frequency (about 20 Hz) of the existing voice coil motor.

In some embodiments of the present disclosure, a plurality of first pads 1224 are formed on an upper surface 1222 of the fixed electrode 122, and a plurality of second pads 1244 are formed on an upper surface 1242 of the movable electrode 124. A plurality of the deformable connection members 126 exist, and the connection tabs 1264 are fixedly connected with the first pad 1224 and the second pad 1244 respectively such that each deformable connection member 126 is configured to fixedly connect the fixed electrode 122 with the movable electrode 124.

In some embodiments of the present disclosure, a plurality of the first pads 1224 may be formed on the fixed electrode 122 and a plurality of the second pads 1244 may be formed on the movable electrode 124 by the penetration and photolithography process, and the connection tabs 1264 are fixedly connected with the first pad 1224 and the second pad 1244 respectively in a wire bonding manner. In this way, it may be ensured that the connection member 126 is fixedly connected with the fixed electrode 122 and the movable electrode 124 respectively. Moreover, since the fixed electrode 122 and the movable electrode 124 are fixedly connected by a plurality of connection members 126, that is, there are redundant connections. In this way, even if some of the connection members 126 are broken, the fixed electrode 122 and the movable electrode 124 may still be fixedly connected via the remaining connection members 126.

In some embodiments of the present disclosure, the image sensor 14 may be fixed to the movable electrode 124 by glue.

In this way, the process is simple, thus facilitating the manufacture.

In some embodiments of the present disclosure, the optical image stabilization system 10 includes a circuit board 16, and the fixed electrode 122 is disposed on the circuit board 16. A plurality of third pads 164 are formed on an upper surface 162 of the circuit board 16. A plurality of fourth pads 1226 are formed on an upper surface 1222 of the fixed electrode 122. A plurality of the third pads 164 are connected to a plurality of the fourth pads 1226 via first wires 166. The driving voltage is applied to the fixed electrode 122 from the circuit board 16 through the first wires 166 and applied to the movable electrode 124 from the circuit board 16 through the first wires 166 and some of the connection members 126.

In this way, some of the connection members 126 are configured to transmit the driving voltage to the fixed electrode 122 and the movable electrode 124. The connection member 126 is not only functioned as a mechanical connection, but also can realize an electrical connection, thus realizing two functions at the same time, which may simplify the structure, reduce the amount of components and reduce cost.

A plurality of fifth pads 144 are formed on an upper surface 142 of the image sensor 14, a plurality of fifth pads 144 are connected to some of the second pads 1244 via second wires 168. The circuit board 16 is electrically connected to the image sensor 14 via the first wires 166, some of the connection members 126, and the second wires 168.

In this way, some of the connection members 126 are configured to transmit control signals and image signals. The connection member 126 is not only functioned as a mechanical connection, but also can realize an electrical connection, thus realizing two functions at the same time, which may simplify the structure, reduce the amount of components and reduce cost.

In some embodiments of the present disclosure, the circuit board 16 is a flexible circuit board. The optical image stabilization system 10 further includes a reinforcing plate 18 attached to a surface of the circuit board 16 opposite to the MEMS 12. The reinforcing plate 18 is configured to increase the mechanical strength of the circuit board 16.

Alternatively, in other embodiments of the present disclosure, the circuit board 16 may not be limited to the embodiments described above, and may be a rigid circuit board.

In some embodiments of the present disclosure, a groove 161 is defined in the circuit board 16, and the MEMS 12 and the image sensor 14 are disposed in the groove 161.

In this way, the whole height of the optical image stabilization system 10 may be reduced, which is advantage for miniaturization.

In some embodiments of the present disclosure, the fixed electrode 122 is fixed on the circuit board 16 by glue.

In this way, the process is simple, thus facilitating the manufacture.

In some embodiments of the present disclosure, an annular through recess 163 is defined in the circuit board 16 and separates the circuit board 16 into a movable part 165, and a fixed part 167 surrounding the movable part 165, in which the fixed electrode 122 is disposed on the fixed part 167 and the movable electrode 124 is disposed on the movable part 165.

In this way, the movable electrode 124 is able to move while being fixedly connected to the circuit board 16.

The movable electrode 124 may also be fixed to the movable part 165 by glue.

In some embodiments of the present disclosure, a via hole 1246 is defined in the movable electrode 124, and the image sensor 14 is electrically connected to the movable part 165 via a conductive paste layer 169 filled in the via hole 1246.

Figure 5:
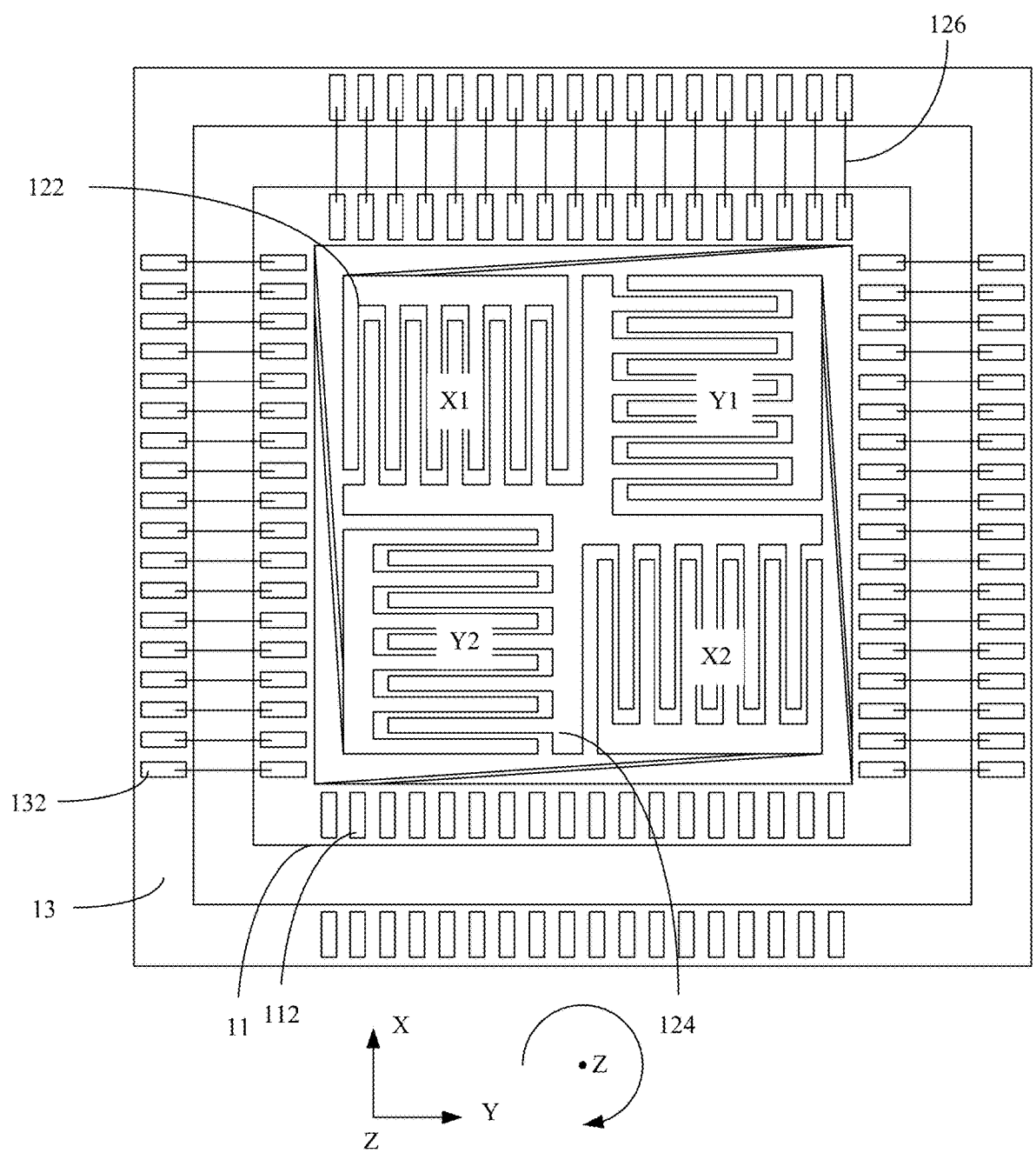
FIG. 5 is a schematic view of a micro electro-mechanical system according to another embodiment of the present disclosure.
Figure 6:
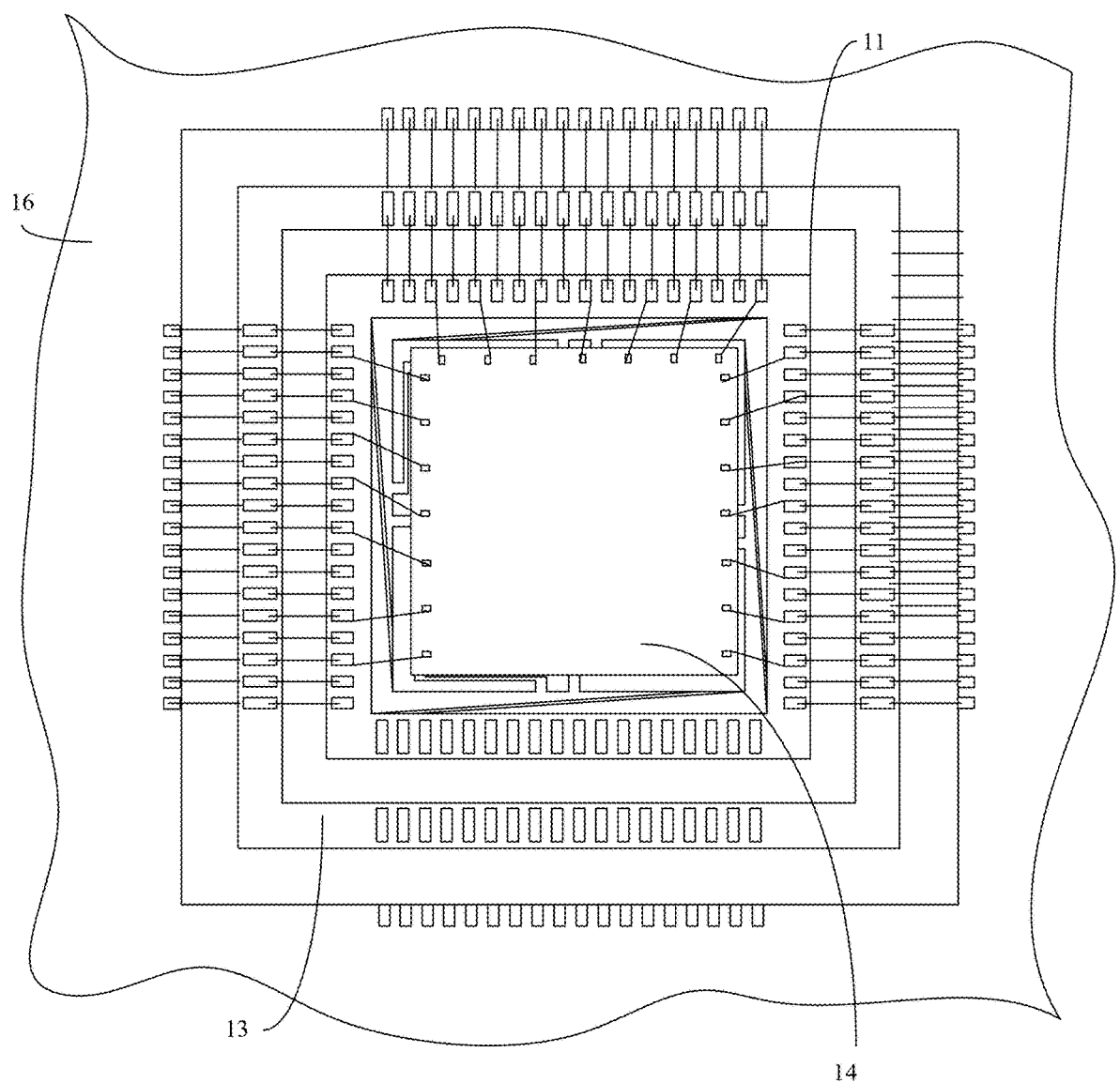
FIG. 6 is a schematic view of an optical image stabilization system according to another embodiment of the present disclosure.
Figure 7:
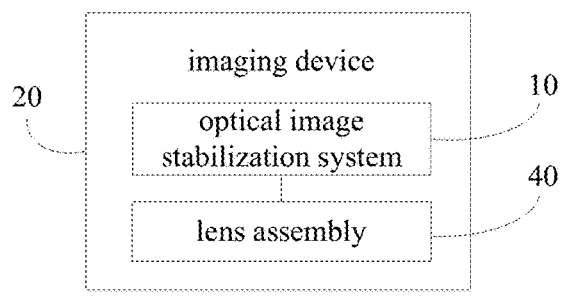
FIG. 7 is a block diagram of an imaging device according to an embodiment of the present disclosure.

With reference to FIGS. 5 and 6, in some embodiments of the present disclosure, the fixed electrode 122 and the movable electrode 124 are pectinate electrodes cooperating with each other.

When the pectinate electrode is applied, the cooperating area between the fixed electrode 122 and the movable electrode 124 is increased, and the driving voltage is converted into the electrostatic force with a high efficiency, which may further reduce the power consumption of the optical image stabilization system 10.

A first pair X1 of the fixed electrode 122 and the movable electrode 124, a second pair Y1 of the fixed electrode 122 and the movable electrode 124, a third pair X2 of the fixed electrode 122 and the movable electrode 124 and a fourth pair Y2 of the fixed electrode 122 and the movable electrode 124 exist, the first pair X1, the second pair Y1, the third pair X2 and the fourth pair Y2 are distributed in a shape of a Chinese character "田", the first pair X1 and the third pair X2 are configured to drive the image sensor 14 to move in a first direction (for example, an X direction) respectively, and the second pair Y1 and the fourth pair Y2 are configured to simultaneously drive the image sensor 14 to move in a second direction (for example, a Y direction) perpendicular to the first direction (for example, the X direction).

In this way, a motion compensation may be realized in the first direction (for example, the X direction) and the second direction (for example, the Y direction), and by controlling the first pair X1 and the third pair X2 to drive the image sensor 14 to move in opposite directions, a rotation compensation may be realized in a third direction (for example, a Z direction) perpendicular to the first direction (for example, the X direction) and the second direction (for example, the Y direction).

In some embodiments of the present disclosure, the MEMS 12 further includes an inner frame 11 and an outer frame 13. The inner frame 11 is fixedly connected to the movable electrodes 124 of the first pair X1, the second pair Y1, the third pair X2 and the fourth pair Y2. The outer frame 13 is fixedly connected to the fixed electrodes 122 of the first pair X1, the second pair Y1, the third pair X2 and the fourth pair Y2. The deformable connection member 126 is configured to fixedly connect the fixed electrode 122 with the movable electrode 124 by fixedly connecting the inner frame 11 with the outer frame 13.

In this way, the process is simple, thus facilitating the manufacture.

In some embodiments of the present disclosure, the inner frame 11 and the outer frame 13 both have a substantially rectangular shape, and an inner frame pad 112 is formed on an upper surface of the inner frame 11 and an outer frame pad 132 is formed on an upper surface of the outer frame 13.

The connection member 126 is configured to fixedly connect the inner frame 11 with the outer frame 13 by being fixedly disposed on the inner frame pad 112 and the outer frame pad 132.

In this way, the process is simple, thus facilitating for manufacture.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. The appearances of above phrases in various places throughout this specification are not necessarily referring to the same embodiment or example of the present disclosure. Furthermore, the particular features, structures, materials, or characteristics may be combined in any suitable manner in one or more embodiments or examples. Although explanatory embodiments have been shown and described above, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An optical image stabilization system, comprising:
a micro electro-mechanical system comprising:
    a fixed electrode;
    a movable electrode cooperating with the fixed electrode; and
    a deformable connection member for fixedly connecting the fixed electrode with the movable electrode, wherein the movable electrode is floating to and connected with the fixed electrode by the connection member; and
an image sensor fixedly connected to the movable electrode;
wherein the fixed electrode and the movable electrode are configured to generate an electrostatic force under a driving voltage, the deformable connection member is configured to deform under the electrostatic force in a direction where the movable electrode moves, to make the movable electrode move, so as to drive the image sensor to move to compensate for a jitter;
the deformable connection member comprises a deformable wire and connection tabs connected to both ends of the deformable wire respectively, a plurality of first pads formed on an upper surface of the fixed electrode, and a plurality of second pads are formed on an upper surface of the movable electrode;
a plurality of the deformable connection members exist, and the connection tabs are fixedly connected with the first pad and the second pad respectively such that each deformable connection member is configured to fixedly connect the fixed electrode with the movable electrode;
wherein the optical image stabilization system further comprises a circuit board, and the fixed electrode is disposed on the circuit board;
a plurality of third pads are formed on an upper surface of the circuit board;
a plurality of fourth pads are formed on an upper surface of the fixed electrode;
the plurality of the third pads are connected to the plurality of the fourth pads via first wires;

the driving voltage is applied to the fixed electrode from the circuit board through the first wires and applied to the movable electrode from the circuit board through the first wires and some of the connection members;

a plurality of fifth pads are formed on an upper surface of the image sensor, the plurality of fifth pads are connected to some of the second pads via second wires, and the circuit board is electrically connected to the image sensor via the first wires, some of the connection members and the second wires;

the circuit board is a flexible circuit board, the optical image stabilization system further includes a reinforcing plate attached to a surface of the circuit board opposite to the micro electro-mechanical system.

2. The optical image stabilization system according to claim 1, wherein a size of the micro electro-mechanical system is smaller than or equal to 8.5 mm*8.5 mm.

3. The optical image stabilization system according to claim 1, wherein a power consumption of the micro electro-mechanical system is smaller than 10 mW.

4. The optical image stabilization system according to claim 1, wherein a mechanical frequency of the micro electro-mechanical system is in a range of 80 to 120 Hz.

5. The optical image stabilization system according to claim 1, wherein the micro electro-mechanical system comprises a plurality of pairs of the fixed electrodes and the movable electrodes, and the plurality of pairs of the fixed electrodes and the movable electrodes are configured to drive the image sensor to move in different directions.

6. The optical image stabilization system according to claim 1, wherein the deformable wire is a silicon wire.

7. The optical image stabilization system according to claim 6, wherein the deformable wire has a rectangular cross-section, a width of 10 to 30 μm, a thickness of 1 to 3 μm, and a length of 500 to 800 μm;

a width direction of the deformable wire is perpendicular to a moving direction of the movable electrode.

8. The optical image stabilization system according to claim 6, wherein a deformation of the deformable wire in a moving direction of the movable electrode under the electrostatic force is proportional to the electrostatic force when the electrostatic force is smaller than a predetermined threshold.

9. The optical image stabilization system according to claim 8, wherein the deformation is smaller than or equal to 150 μm when the electrostatic force is smaller than the predetermined threshold.

10. The optical image stabilization system according to claim 1, wherein a groove is defined in the circuit board, and the micro electro-mechanical system and the image sensor are disposed in the groove.

11. The optical image stabilization system according to claim 10, wherein an annular through recess is defined in the circuit board and separates the circuit board into a movable part and a fixed part surrounding the movable part, in which the fixed electrode is disposed on the fixed part and the movable electrode is disposed on the movable part.

12. The optical image stabilization system according to claim 11, wherein a via hole is defined in the movable electrode, and the image sensor is electrically connected to the movable part via a conductive paste layer filled in the via hole.

13. The optical image stabilization system according to claim 1, wherein the fixed electrode and the movable electrode are pectinate electrodes cooperating with each other.

14. The optical image stabilization system according to claim 13, wherein the optical image stabilization system comprises a first pair of the fixed electrode and the movable electrode, a second pair of the fixed electrode and the movable electrode, a third pair of the fixed electrode and the movable electrode, and a fourth pair of the fixed electrode and the movable electrode, the first pair, the second pair, the third pair, and the fourth pair are distributed in a shape of a Chinese character "田", the first pair and the third pair are configured to drive the image sensor to move in a first direction respectively, and the second pair and the fourth pair are configured to simultaneously drive the image sensor to move in a second direction perpendicular to the first direction.

15. The optical image stabilization system according to claim 14, wherein the first pair, the second pair, the third pair, and the fourth pair are further configured to drive the image sensor to rotate in a third direction perpendicular to both the first direction and the second direction by cooperating with each other.

16. The optical image stabilization system according to claim 14, wherein the micro electro-mechanical system further comprises:

an inner frame fixedly connected to the movable electrodes of the first pair, the second pair, the third pair, and the fourth pair;

an outer frame fixedly connected to the fixed electrodes of the first pair, the second pair, the third pair, and the fourth pair;

wherein the deformable connection member is configured to fixedly connect the fixed electrode with the movable electrode by fixedly connecting the inner frame with the outer frame.

17. The optical image stabilization system according to claim 16, wherein the inner frame and the outer frame both have a rectangular shape, and an inner frame pad is formed on an upper surface of the inner frame and an outer frame pad is formed on an upper surface of the outer frame;

the connection member is configured to fixedly connect the inner frame with the outer frame by being fixedly disposed on the inner frame pad and the outer frame pad.

18. An imaging device, comprising an optical image stabilization system, wherein the optical image stabilization system comprises:

a micro electro-mechanical system comprising:
 a fixed electrode;
 a movable electrode cooperating with the fixed electrode; and
 a deformable connection member for fixedly connecting the fixed electrode with the movable electrode, wherein the movable electrode is floating to and connected with the fixed electrode by the connection member; and an image sensor fixedly connected to the movable electrode;

wherein the fixed electrode and the movable electrode are configured to generate an electrostatic force under a driving voltage, the deformable connection member is configured to deform under the electrostatic force in a direction where the movable electrode moves, to make the movable electrode move, so as to drive the image sensor to move to compensate for a jitter;

the deformable connection member comprises a deformable wire and connection tabs connected to both ends of the deformable wire respectively, a plurality of first pads formed on an upper surface of the fixed electrode, and a plurality of second pads are formed on an upper surface of the movable electrode;

a plurality of the deformable connection members exist, and the connection tabs are fixedly connected with the first pad and the second pad respectively such that each deformable connection member is configured to fixedly connect the fixed electrode with the movable electrode;

wherein the optical image stabilization system further comprises a circuit board, and the fixed electrode is disposed on the circuit board;

a plurality of third pads are formed on an upper surface of the circuit board;

a plurality of fourth pads are formed on an upper surface of the fixed electrode;

the plurality of the third pads are connected to the plurality of the fourth pads via first wires;

the driving voltage is applied to the fixed electrode from the circuit board through the first wires and applied to the movable electrode from the circuit board through the first wires and some of the connection members;

a plurality of fifth pads are formed on an upper surface of the image sensor, the plurality of fifth pads are connected to some of the second pads via second wires, and the circuit board is electrically connected to the image sensor via the first wires, some of the connection members and the second wires;

the circuit board is a flexible circuit board, the optical image stabilization system further includes a reinforcing plate attached to a surface of the circuit board opposite to the micro electro-mechanical system.

19. An electronic device, comprising an imaging device, wherein the imaging device comprises an optical image stabilization system comprising:
   a micro electro-mechanical system comprising:
      a fixed electrode;
      a movable electrode cooperating with the fixed electrode; and
      a deformable connection member for fixedly connecting the fixed electrode with the movable electrode, wherein the movable electrode is floating to and connected with the fixed electrode by the connection member; and
   an image sensor fixedly connected to the movable electrode;
   wherein the fixed electrode and the movable electrode are configured to generate an electrostatic force under a driving voltage, the deformable connection member is configured to deform under the electrostatic force in a direction where the movable electrode moves, to make the movable electrode move, so as to drive the image sensor to move to compensate for a jitter;
   the deformable connection member comprises a deformable wire and connection tabs connected to both ends of the deformable wire respectively, a plurality of first pads formed on an upper surface of the fixed electrode, and a plurality of second pads are formed on an upper surface of the movable electrode;
   a plurality of the deformable connection members exist, and the connection tabs are fixedly connected with the first pad and the second pad respectively such that each deformable connection member is configured to fixedly connect the fixed electrode with the movable electrode;
   wherein the optical image stabilization system further comprises a circuit board, and the fixed electrode is disposed on the circuit board;
   a plurality of third pads are formed on an upper surface of the circuit board;
   a plurality of fourth pads are formed on an upper surface of the fixed electrode;
   the plurality of the third pads are connected to the plurality of the fourth pads via first wires;
   the driving voltage is applied to the fixed electrode from the circuit board through the first wires and applied to the movable electrode from the circuit board through the first wires and some of the connection members;
   a plurality of fifth pads are formed on an upper surface of the image sensor, the plurality of fifth pads are connected to some of the second pads via second wires, and the circuit board is electrically connected to the image sensor via the first wires, some of the connection members and the second wires;
   the circuit board is a flexible circuit board, the optical image stabilization system further includes a reinforcing plate attached to a surface of the circuit board opposite to the micro electro-mechanical system.

* * * * *